(12) United States Patent
Du et al.

(10) Patent No.: US 12,710,909 B2
(45) Date of Patent: Aug. 18, 2026

(54) TRANSFERRING A VISUAL REPRESENTATION OF SPEECH BETWEEN DEVICES

(71) Applicant: Google LLC, Mountain View, CA (US)

(72) Inventors: Ruofei Du, San Francisco, CA (US); Volodymyr Kyryliuk, San Francisco, CA (US); Jason Mayes, San Francisco, CA (US); Na Li, Palo Alto, CA (US); Ping Yu, Mountain View, CA (US); Alex Olwal, Santa Cruz, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 19/102,099

(22) PCT Filed: Sep. 1, 2022

(86) PCT No.: PCT/US2022/075849
§ 371 (c)(1),
(2) Date: Feb. 7, 2025

(87) PCT Pub. No.: WO2024/049481
PCT Pub. Date: Mar. 7, 2024

(65) Prior Publication Data
US 2025/0370689 A1 Dec. 4, 2025

(51) Int. Cl.
*G06F 3/14* (2006.01)

(52) U.S. Cl.
CPC .................................. *G06F 3/1423* (2013.01)

(58) Field of Classification Search
CPC ........ G06F 3/1423; G06F 3/011; G06F 3/012; G06F 3/013; G02B 27/0093; G02B 2027/014; H04N 21/4126; H04N 21/4884
See application file for complete search history.

(56) References Cited

U.S. PATENT DOCUMENTS

2002/0101537 A1* 8/2002 Basson ........... H04N 21/41415 348/E5.145
2013/0147686 A1* 6/2013 Clavin ................ G02B 27/017 345/8

(Continued)

FOREIGN PATENT DOCUMENTS

WO 2020222988 A1 11/2020

OTHER PUBLICATIONS

International Search Report and Written Opinion for PCT Application No. PCT/US2022/075849, mailed on Feb. 14, 2023, 12 pages.

(Continued)

*Primary Examiner* — Brent D Castiaux
(74) *Attorney, Agent, or Firm* — Brake Hughes Bellermann LLP

(57) ABSTRACT

Methods and devices are provided to allow for the transfer of a display of a visual representation between a head mounted device and a computing device during the display of a video. A video is displayed on a computing device display of a computing device, a visual representation of a speech for an audio component of the video is received, the visual representation is displayed on the computing device display, and the display of the visual representation is transferred to the head mounted device to display on a head mounted device display upon determining that a head mounted device is in use.

20 Claims, 11 Drawing Sheets

(56) References Cited

U.S. PATENT DOCUMENTS

| | | | |
|---|---|---|---|
| 2019/0238719 | A1 | 8/2019 | Alameh et al. |
| 2020/0274582 | A1 | 8/2020 | Lee et al. |
| 2021/0321169 | A1 | 10/2021 | Mohapatra et al. |
| 2022/0053039 | A1 | 2/2022 | Bhatt et al. |
| 2022/0236942 | A1 | 7/2022 | Wu et al. |

OTHER PUBLICATIONS

Surale, et al., “ARCALL: Real-Time AR Communciation Using Smartphones and Smartglasses”, AHs’22, Kashiwanoha, Japan, arXiv:2203.04358v1 [cs.HC], Mar. 8, 2022, 19 pages.

* cited by examiner

100

TRANSFERRING A VISUAL REPRESENTATION OF SPEECH BETWEEN DEVICES

CROSS-REFERENCE TO RELATED APPLICATION

This application is a 35 U.S.C. § 371 National Phase Entry Application from PCT/US2022/075849, filed on Sep. 1, 2022, entitled "TRANSFERRING A VISUAL REPRESENTATION OF SPEECH BETWEEN DEVICES", the disclosure of which is incorporated herein by reference in its entirety.

TECHNICAL FIELD

This description relates to providing a visual representation of speech from a video.

BACKGROUND

This description generally relates to methods and devices to display a visual representation of a speech component of a video while the video is playing. Visual representations, including translations, transliterations, summaries of human speech, subtitles, captions, emojis, or graphics, may make videos more accessible and understandable to users.

SUMMARY

The present application addresses the problem of providing a visual representation of speech as a user watches a video across multiple devices. In examples, a video may be displayed on a personal computing device (such as a handheld device, a laptop, a smart monitor, a desktop, a tablet, etc.) and watched by the user through the lens of a head mounted device worn by the user. In examples, the user may watch the video and visual representation both displayed on the computing device. Upon powering up and/or placing the head mounted device on the user's head, however, the display of the visual representation may be seamlessly transferred to a head mounted device display. The user may then see the visual representation displayed on a head mounted device display while also viewing a video on the computing device display through the lenses of the head mounted device. In some examples, the visual representation of speech may first be displayed on the head mounted device, and upon determining that the visual representation is subsequently displayed on a computing device, the display of the visual representation may cease to be displayed on the head mounted device, and/or seamlessly transferred to the computing device display.

Certain conditions may trigger transferring the visual representation back to the computing device display for display along with the video. Other conditions may trigger transferring the visual representation to the head mounted device for display.

In some aspects, the techniques described herein relate to a computer-implemented method, including: displaying a video on a computing device display of a computing device; receiving a visual representation of a speech for an audio component of the video; displaying the visual representation on the computing device display; and upon determining that a head mounted device is in use, transferring display of the visual representation to the head mounted device to display on a head mounted device display.

In some aspects, the techniques described herein relate to a computing device, including: a computing device display; and a processor configured with instructions to: display a video on a computing device display of a computing device; receive a visual representation of a speech for an audio component of the video; display the visual representation on the computing device display; and transfer display of the visual representation to a head mounted device to display on a head mounted device display upon determining that a head mounted device is in use.

In some aspects, the techniques described herein relate to a computer-implemented method, including: determining that a video and a visual representation of a speech component of the video are being displayed on a computing device display of a computing device; receiving an indication to transfer display of the visual representation to a head mounted device display of the head mounted device; receiving the visual representation of a speech from an audio component of the video from the computing device; and displaying the visual representation on the head mounted device display.

In some aspects, the techniques described herein relate to a head mounted device, including: a head mounted device display; and a processor configured with instructions to: determine that a video and a visual representation of a speech component of the video are being displayed on a computing device display of a computing device, receive an indication to transfer display of the visual representation to a head mounted device display of the head mounted device, receive the visual representation of a speech from an audio component of the video from the computing device, and display the visual representation on the head mounted device display.

In some aspects, the techniques described herein relate to receiving a visual representation of a speech from an audio component of a video, displaying the visual representation on the head mounted device display, receiving an indication to transfer display of the visual representation to a computing device display of a computing device, and ceasing to display the visual representation on the head mounted device display.

In some aspects, the techniques described herein relate to a head mounted device, comprising: a head mounted device display; and a processor configured with instructions to: receive a visual representation of a speech from an audio component of a video, display the visual representation on the head mounted device display, receive an indication to transfer display of the visual representation to a computing device display of a computing device, and cease to display the visual representation on the head mounted device display.

DETAILED DESCRIPTION

Figure 1:
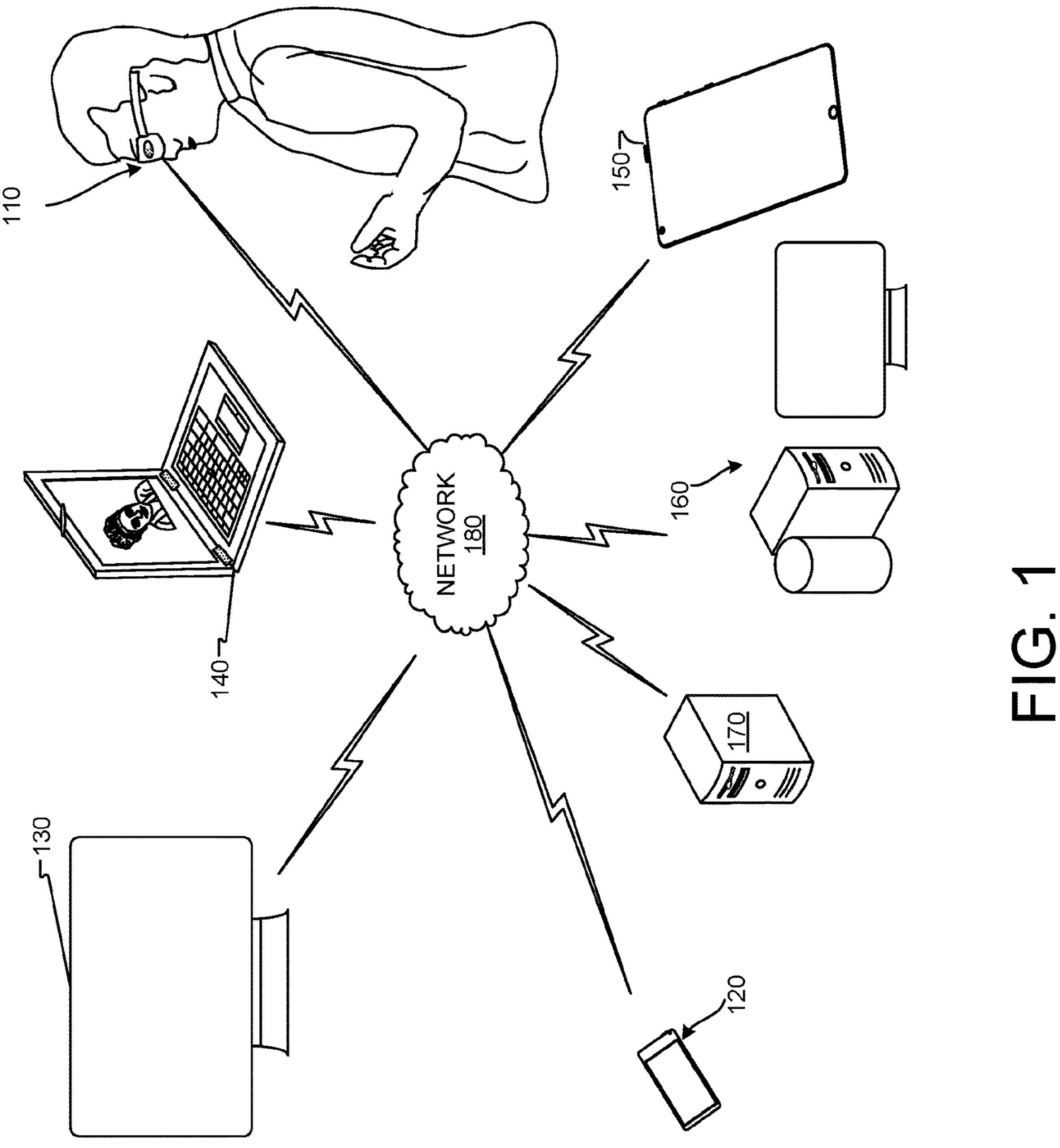
FIG. 1 depicts an example of a user watching a video with a visual representation provided using a system of devices and software, according to examples described throughout this disclosure.

This disclosure describes methods and devices for the seamless transfer of a visual representation of the speech component of a video between a head mounted device and a computing device while the video is playing on one of the devices. In an example, a user may watch a video on a computing device such as a mobile phone or laptop. The computing device may also display a visual representation of a speech component of the video along with the video. If a user puts on head mounted device that also displays the visual representation of the speech, however, then the user may see the visual representation twice, which may be confusing. In examples, when the user powers on a head mounted device and/or places it on his or her head, the display of the visual representation may be transferred from the computing device to the head mounted device. In other words, the visual representation may cease to be displayed on the computing device, and instead be displayed on the head mounted device.

In an example, a user may wear a head mounted device that displays the visual representation of the speech from a video. The video may be viewed through the transparent or semi-transparent lenses of the head mounted device on a computing device or pm a head mounted device display. The user may then come into view of a computing device display displaying the visual representation with the video, however. The visual representation may then be displayed twice, which may be confusing for the user. In examples, when the visual representation is displayed on both the head mounted device display and the computing device display, display of the visual representation may be transferred from the head mounted device to the computing device.

In examples, various events may prompt the display of the visual representation to transfer between the head mounted device and the user's computing device, as are further described below.

Users may watch videos using computing devices with displays. Computing devices may include, for example, handheld devices (smartphones and the like), head mounted devices (smart glasses, goggles, headsets and the like), neck worn lanyard devices, other mobile devices (tablet computing devices and the like), desktop and laptop computing devices, smart televisions, and/or other such devices.

In examples, the video may include a movie, a live streamed event, or a web conference. An example web conference may include two or more people connected via their own respective computing devices, each respective computing device generating its own respective video and/or audio feed to be sent to each of the other computing devices associated with other meeting participants. Each respective user computing device may be operable to display the video and/or audio feeds of other meeting participants.

In examples, a user watching a video, live streamed event, or web conference may desire a visual representation of the dialogue from the video to be displayed while the user is watching. The visual representation may include translations, transliterations, summaries of human speech, subtitles, captions, emojis, or graphics. Providing visual representation services seamlessly across devices may increase the accessibility of the speech from the video.

In some examples, users may use a combination of computing devices with a combination of displays together at the same time to watch videos. For example, FIG. 1 depicts a user in connection with an example device system 100 which may be used to watch a video, live-stream an event, or participate in a web conference. In the example shown in FIG. 1, the user is watching a video wearing a head mounted device 110, for example, an augmented reality viewing device, a virtual reality device, or smart glasses, and using a laptop device 140, for purposes of discussion and illustration. In examples, system 100 may include other computing and/or electronic devices that users may use to watch videos and view visual representation s of speech from those videos. Example computing devices may include a handheld device 120 such as, for example, a smartphone, a display screen 130, which may include a television monitor or a monitor connected to any computing device, a laptop device 140, a tablet device 150, and a desktop device 160. The devices may be in communication with one or more servers 170 via the network 180. Server 170 may include, for example, a configuration server providing coordination between watching devices. In examples, the computing devices may communicate over a network 180 and/or over alternative network(s). Network 180 may include a local area network or a personal area network using any combination wired or wireless communication, including but not limited to Wi-Fi, ethernet, Bluetooth, IrDA, etc.

Figure 2A:
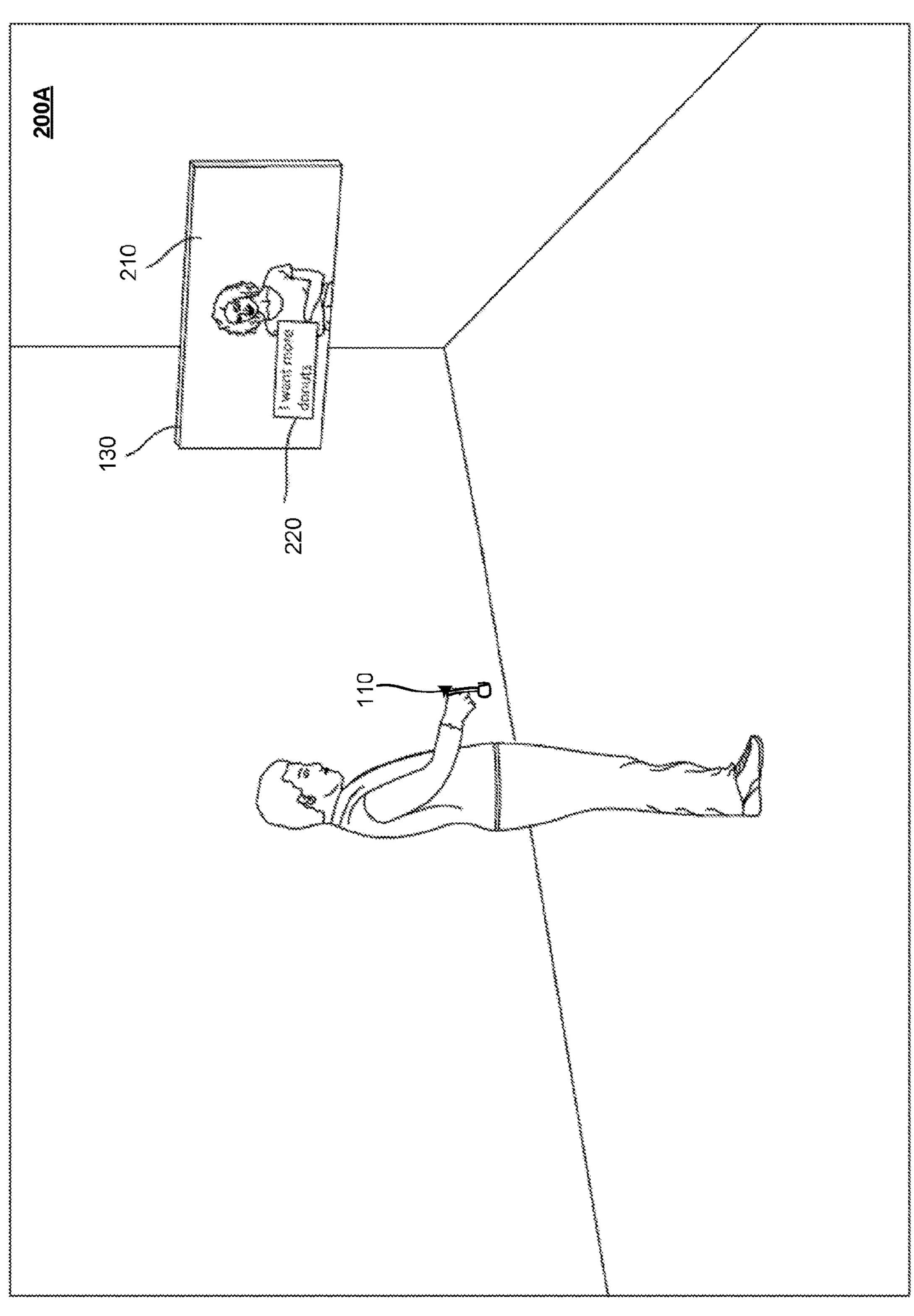
FIGS. 2A and 2B depict examples of a user watching a video in different modes of visual representation display according to an example.
Figure 2B:
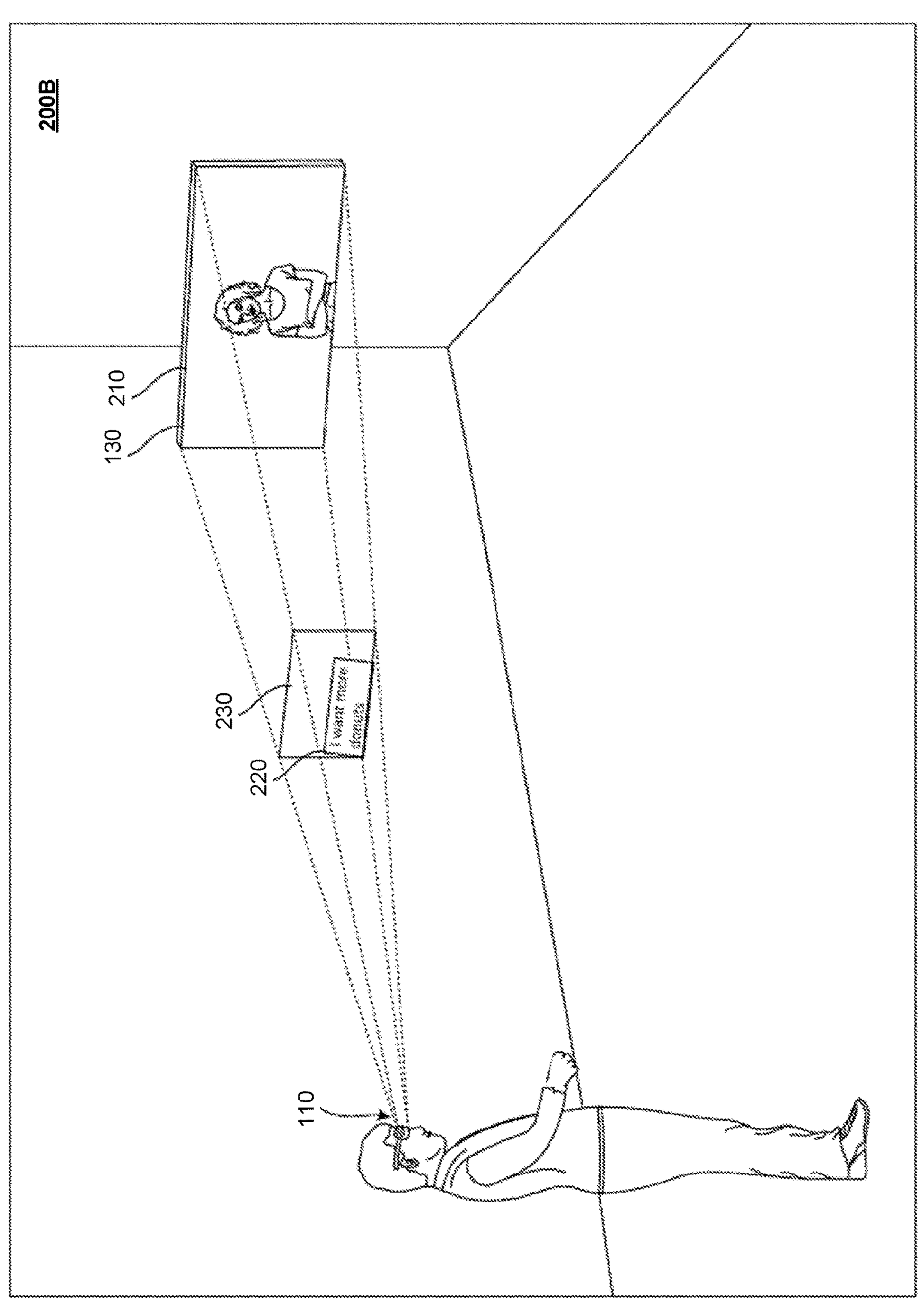

FIGS. 2A and 2B depict examples of a user watching a video with different modes of visual representation display. FIG. 2A depicts a mode 200A, and FIG. 2B depicts a mode 200B. In both FIGS. 2A and 2B, the user is watching video 210 on video display screen 130. This is not intended to be limiting. In examples, the user may be watching a video on any combination of handheld device 120, video display screen 130, laptop device 140, tablet device 150, tablet device 150, or desktop device 160.

In example mode 200A, the user is watching video 210 on video display screen 130. Visual representation 220 is displayed on video display screen 130. In examples, visual representation 220 may be displayed anywhere on video display screen 130. In example visual representation 220 may overlay or partially overlay video 210. It may further be seen in example FIG. 2A that user is holding head mounted device 110 but is not wearing or using it yet.

In example mode 200B, the user is wearing head mounted device 110. Video 210 is displaying on video display screen 130, however visual representation 220 is displayed differently. Visual representation 220 is displayed on a head mounted device display 230. As such, the user in mode 200B is using a combination of head mounted device 110 and video display screen 130 watch video 210 with visual representation 220.

Figure 3:
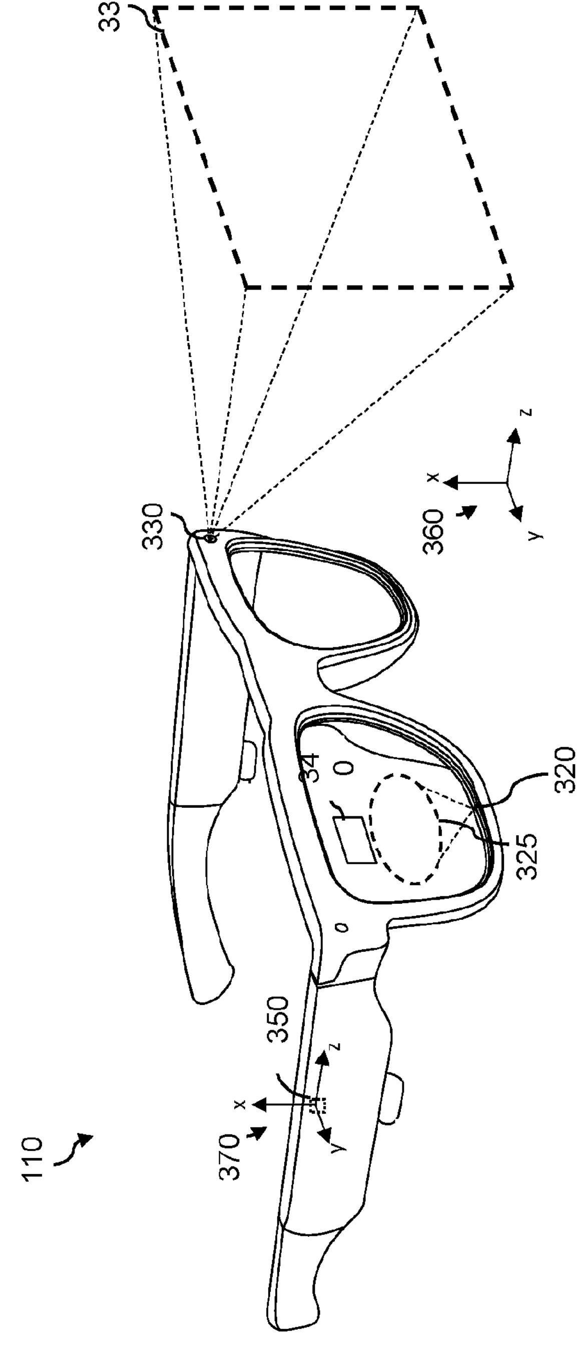
FIG. 3 depicts a perspective view of a head mounted device according to an example.

FIG. 3 depicts a perspective view of a head mounted device 110 according to an example. As shown, head mounted device 110 may be implemented as smart glasses (e.g., augmented reality, virtual reality, simulated reality, mixed reality, see-through reality, blended reality, or alternative reality glasses) configured to be worn on a head of a user. Head mounted device 110 includes a left lens and a right lens coupled to the ears of a user by a left arm and a right arm, respectively. The user may view the world through the left lens and the right lens, which are coupled together by a bridge configured to rest on the nose of the wearer.

Head mounted device 110 includes a head mounted device display 340, operable to present a display to a user wearing head mounted device 110. In examples, head mounted device display 340 may be configured to display information (e.g., text, graphics, image) in one or both lenses. Head mounted device display 340 may include all or part of the lens(es) of head mounted device 110 and may be visually clear or translucent so that when it is not in use the user can view through the display area.

In examples, head mounted device 110 may include sensing devices configured to help determine where a focus of a user is directed. For example, the head mounted device 110 may include at least one front-facing camera 330. Front-facing camera 330 may be directed towards a front field-of-view (i.e., front field of view 335) or can include optics to route light from front field of view 335 to an image sensor. Front field of view 335 may include all (or part) of a field-of-view of the user so that images or video of the world from a point-of-view of the user may be captured by front-facing camera 330.

In examples, head mounted device 110 may further include at least one eye tracking camera. Eye tracking camera 320 may be directed towards an eye field-of-view (i.e., eye field of view 325) or can include optics to route light from eye field of view 325 to an eye image sensor. For example, eye tracking camera 320 may be directed at an eye of a user and include at least one lens to create an image of eye field of view 325 on the eye image sensor. Eye field of view 325 may include all (or part) of a field of an eye. The images of the eyes may be analyzed by a processor of the head mounted device (not shown) to determine where the user is looking. For example, a relative position of the pupil in an image of the eye may correspond to a gaze direction of the user.

In examples, head mounted device 110 may further include at least one orientation sensor 350. Orientation sensor 350 may be implemented as any combination of accelerometers, gyroscopes, and magnetometers combined to form an inertial measurement unit (i.e., IMU) to determine an orientation of a head mounted device. The IMU may be configured to provide a plurality of measurements describing the orientation and motion of the head mounted display. For example, the IMU may have 6 degrees of freedom (6-DOF) which can describe three translation movements (i.e., x-direction, y-direction, or z-direction) along axes of a world coordinate system 360 and can three rotation movements (i.e., pitch, yaw, roll) about the axes of world coordinate system 360. Data from the IMU can be combined with information regarding the magnetic field of the Earth using sensor fusion to determine an orientation of a head mounted device coordinate system 370 with respect to world coordinate system 360. Information from front-facing camera 330, eye field of view 325 and IMU 350 may be combined to determine where a focus of a user is directed, which can enable augmented-reality applications. The head mounted display may further include interface devices for these applications as well.

Figure 4A:
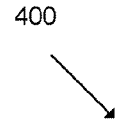
FIG. 4A depicts an example system of devices operable to perform the methods of the disclosure.
Figure 4A:
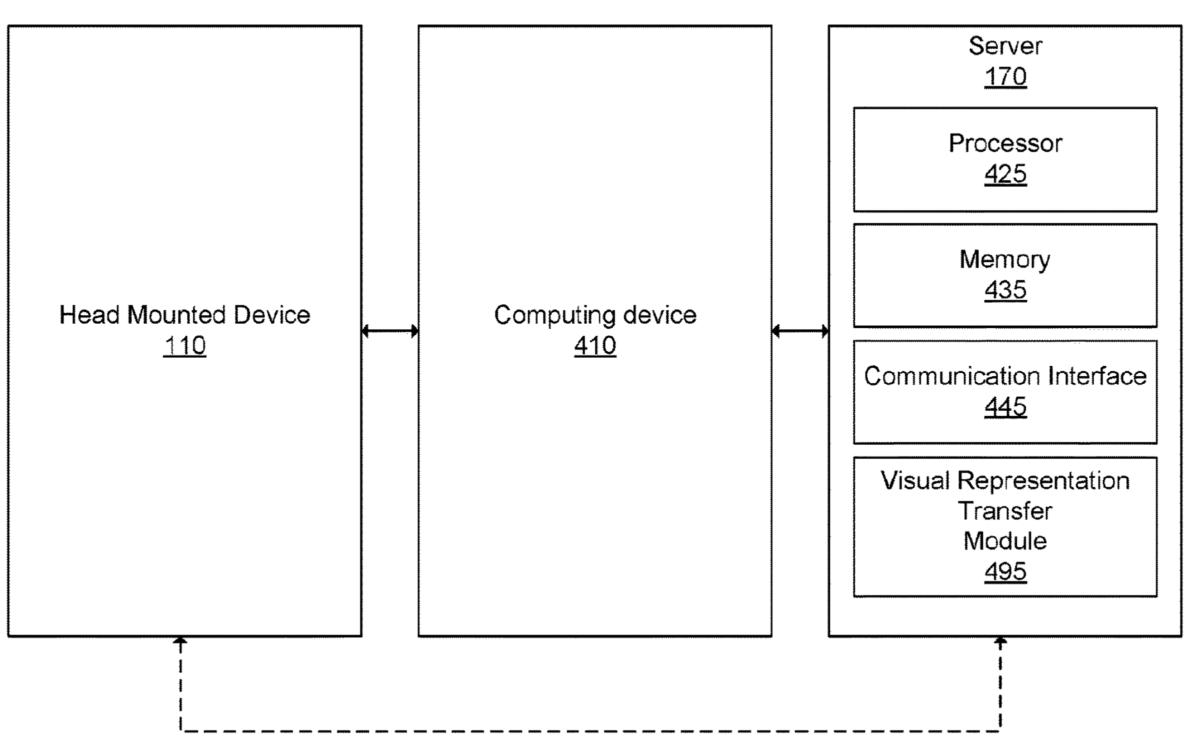

FIG. 4A depicts an example system 400 operable to perform the methods of the disclosure. System 400 includes head mounted device 110 and computing device 410. Head mounted device 110 may communicate directly with computing device 410. In examples, system 400 may further include server 170. Server 170 may communicate with computing device 410. In examples, server 170 may further communicate with head mounted device 110. The components of system 400 may communicate with one another via any wireless or wired method of communication. In examples, head mounted device 110 and computing device 410 may communicate over a local area network. Server 170 may be operable to communicate with head mounted device 110 and computing device 410 over the Internet.

Figure 4B:
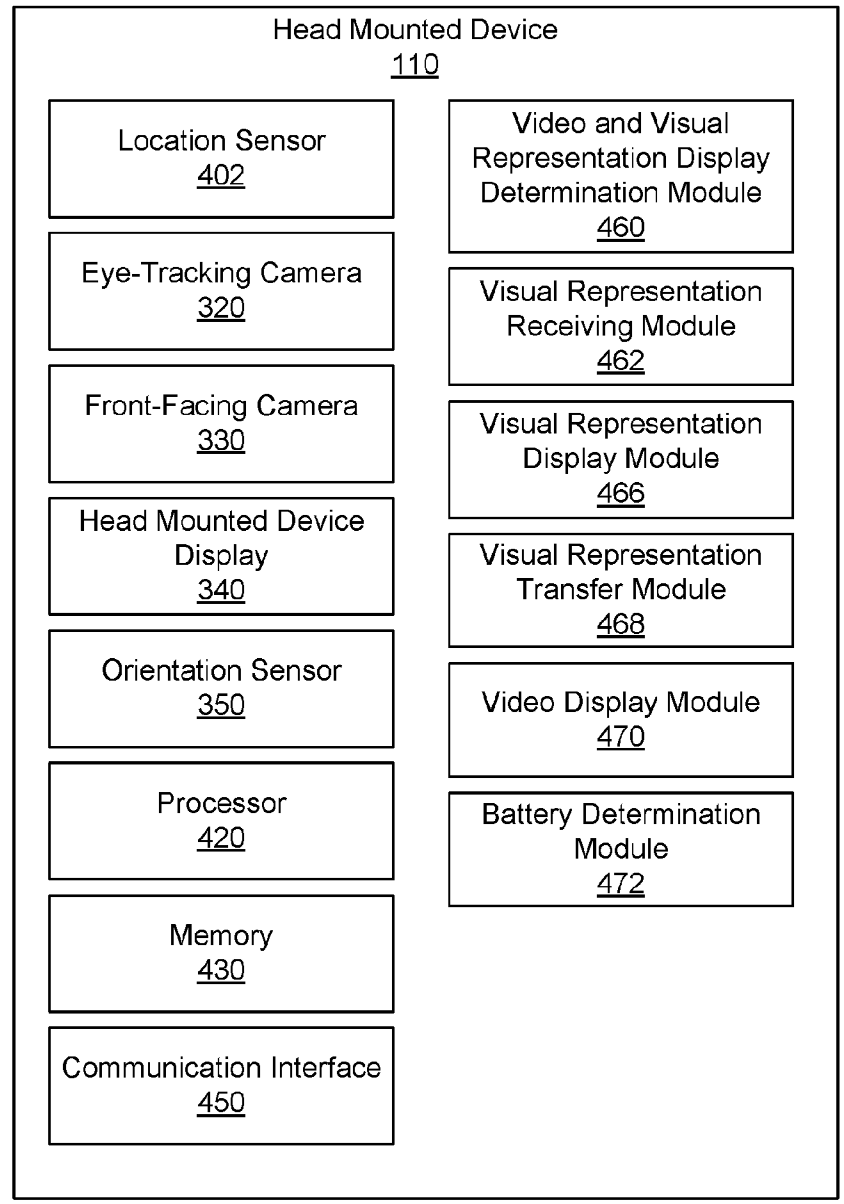
FIG. 4B depicts a block diagram of a head mounted device, according to an example.
Figure 4C:
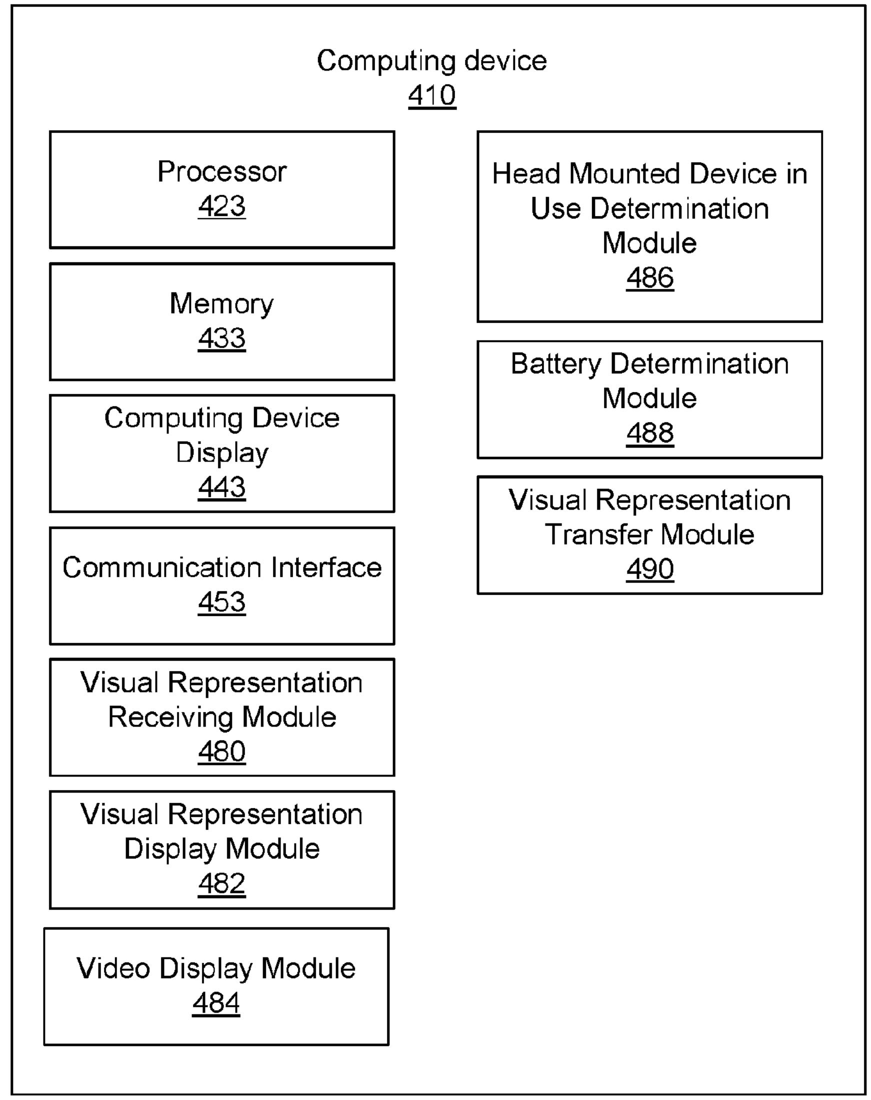
FIG. 4C depicts a block diagram of a computing device, according to an example.

FIG. 4B depicts a block diagram of head mounted device 110, and FIG. 4C depicts a block diagram of computing device 410. The block view of head mounted device 110 in FIG. 4B omits some of the components depicted in FIG. 3 for brevity and clarity. However, head mounted device 110 may include any combination of components depicted in FIGS. 3 and 4B. In FIG. 4B, example head mounted device 110 is depicted as including a location sensor 402, eye tracking camera 320, front-facing camera 330, head mounted device display 340, at least one orientation sensor 350, a processor 420, a memory 430, a communications interface 450, a video and visual representation display determination module 460, a visual representation receiving module 462, a visual representation display module 466, a visual representation transfer module 468, a video display module 470, and a battery determination module 472.

Head mounted device 110 includes a processor 420 and a memory 430. In examples, processor 420 may include multiple processors, and memory 430 may include multiple memories. Processor 420 may be in communication with any cameras, sensors, and other modules and electronics of head mounted device 110. Processor 420 is configured by instructions (e.g., software, application, modules, etc.) to display a visual representation of speech from a video or to facilitate the transfer of the display to another user device. The instructions may include non-transitory computer readable instructions stored in, and recalled from, memory 430. In examples, the instructions may be communicated to processor 420 from a computing device, for example computing device 410, from a network 180 via a communications interface 450.

Processor 420 of head mounted device 110 is in communication with head mounted device display 340. Processor 420 may be configured by instructions to transmit text, graphics, video, images, etc. to head mounted device display 340. For example, processor 420 may be configured to display one or more of video 210 or visual representation 220.

Communications interface 450 of head mounted device 110 may be operable to facilitate communication between head mounted device 110 and computing device 410. In examples, communications interface 450 may utilize Bluetooth, Wi-Fi, Zigbee, or any other wireless or wired communication methods.

In examples, processor 420 of head mounted device 110 may be configured with instructions to execute video and visual representation display determination module 460. Module 460 may provide an indication, message, or signal to other modules indicating whether computing device 410 is displaying a video and a visual representation. In examples, module 460 may determine that an indication, message, or signal has been received from computing device 410 indicating whether computing device 410 is displaying a video and visual representation over communications interface 450. In examples, module 460 may determine that an indication has been received from server 170 whether computing device 410 is displaying video 210 with visual representation 220. In examples, module 460 may use eye tracking camera 320 to determine whether a user is watching video 210 on computing device 410 by observing the reflection of a computing device display in the eye of the user. In examples, module 460 may use front-facing camera 330 to identify whether computing device display playing video 210 is within the field of view of front-facing camera 330 of head mounted device 110.

In examples, processor 420 of head mounted device 110 may be configured with instructions to execute visual representation receiving module 462. In examples, visual representation receiving module 462 may be operable to receive visual representation 220 from computing device 410 or server 170 via communications interface 450. In examples, processor 420 may generate visual representation 220 directly from video 210.

In examples, processor 420 of head mounted device 110 may be configured with instructions to execute visual representation display module 466. Visual representation display module 466 may receive visual representation 220 from visual representation receiving module 462 and display visual representation 220 on head mounted device display 340.

In examples, processor 420 may be configured with instructions to execute visual representation transfer module 468. Upon receiving an indication, visual representation transfer module 468 may be operable to start or to stop the display of visual representation 220 on head mounted device display 340. In examples, an indication may include a signal or command received from computing device 410 or one or more servers 170 instructing head mounted device 110 to begin or cease displaying visual representation 220. In examples, an indication may include a signal received from another module executing on processor 420 operable to determine that computing device 410 is being used with head mounted device 110.

In examples, processor 420 may be configured with instructions to execute video display module 470. Video display module 470 may facilitate the display of video 210 on head mounted device display 340.

In some examples, video display module 470 may also facilitate the display of video 210 upon determining that a user has looked away from computing device display 443 that is displaying video 210. Upon determining that computing device display 443 is not in a field of view of head mounted camera 330, video 21 and visual representation 220 may be displayed on head mounted device display 340. This may be helpful, for example, if the user decides to take a break from watching video 210 on computing device 410. Perhaps, for example, video 210 may include a web conference the user is a participant in, and the user may wish to take a break to make a cup of tea. With video 210 and visual representation 220 continuing to display on head mounted device display 340, the user can continue to observe the web conference or video even while away from the computing device 410.

In examples, processor 420 of head mounted device 110 may be configured with instructions to execute battery determination module 472. Battery determination module 472 may determine whether a head mounted device battery charge level is low or if the battery is otherwise in danger of losing charge. In examples, battery determination module 472 may compare a battery charge level of head mounted device 110 to a battery threshold level.

System 400 further includes computing device 410. FIG. 4C depicts a block diagram of computing device 410. In examples, computing device 410 may include any of handheld device 120, video display screen 130, laptop device 140, tablet device 150, desktop device 160, or any other similar computing device. Computing device 410 includes a processor 423, a memory 433, and a communications interface 453. In examples, processor 423, memory 433, and communications interface 453 may include similar features to processor 420, memory 430, and communications interface 450 described above in reference to head mounted device 110.

Computing device 410 includes a computing device display 443. In examples, computing device display 443 may include an internal or external display component. In the example that computing device 410 is handheld device 120, computing device display 443 may include a mobile phone display. In the example that computing device 410 is desktop device 160, however, computing device display 443 may include an external monitor, and so forth.

Processor 423 of computing device 410 may be configured to execute a visual representation receiving module 480, a visual representation display module 482, a video display module 484, a head mounted device in use determination module 486, a battery determination module 488, and a visual representation transfer module 490.

In examples, visual representation receiving module 480 may receive visual representation 220 from any other module executing on processor 423. In examples, visual representation receiving module 480 may receive visual representation 220 from server 170 or any other device depicted in device system 100.

Visual representation display module 482 may receive visual representation 220 from visual representation receiving module 480 and display visual representation 220 on computing device display 443.

Video display module 484 may facilitate displaying video 210 on computing device display 443. In examples, video 210 may be stored on memory 433, or streamed from server 170. In examples, video 210 may include a video conference.

Head mounted device in use determination module 486 may be operable to determine if head mounted device 110 is in use with computing device 410. In examples, use determination module 486 may determine that head mounted device 110 and computing device 410 are being used at the same time, or if they are being used together to view video 210 on computing device display 443.

In examples, head mounted device in use determination module 486 may determine that the same user is logged onto both head mounted device 110 and computing device 410. In examples, use determination module 486 may determine that an indication has been received from server 170 that head mounted device 110 is in use. In examples, head mounted device in use determination module 486 may receive an indication that head mounted device 110 determined that a user is watching video 210 on computing device 410 by observing the reflection of a computing device display in the eye of the user using eye tracking camera 320. In examples, video and visual representation display determination module 460 may use front-facing camera 330 of head mounted device 110 to identify that computing device display is displaying video 210.

In examples, video and visual representation display determination module 460 may determine that a location and orientation of the head mounted device indicate whether the user is viewing the computing device display though the head mounted device. For example, one or more location sensors 402 of head mounted device 110 may be configured to determine a location of head mounted device (i.e., of the user). Location sensor 402 may include an ultra-wideband (UWB) sensor. Location sensor 402 may be in communication with computing device 410 over communications interface 450. For example, head mounted device 110 and communications interface 450 may exchange packets of information over a UWB communication link to determine the relative locations of the devices. For example, location sensor 402 may be configured to determine a round-trip time (RTT) for a packet to be communicated between the devices. In examples, location sensor 402 may include multiple receivers configured to receive the packet communicated from the computing device 410. Location sensor 402 may be configured to determine times of arrival of the packet at the receivers to determine an angle between computing device 410 and location sensor 402. Location sensor(s) may further include a global positioning system (GPS) sensor, which can be used to determine a geographic location of the head mounted device (i.e., user). The geographic location may be further determined through a sensor fusion approach in which information from a local area network (e.g., Wi-Fi network) and/or cellular network can further refine the geographic location.

In examples, video and visual representation display determination module 460 may determine whether a user is watching video 210 with or without visual representation 220 on computing device 410 by predicting, by at least one prediction model, whether the head mounted device is in use with the computing device. In examples, the prediction model may comprise a machine learning model. For example, a database of mappings may be built or trained via machine learning over time, connecting groups of fingerprinted IDs to groups of sources (e.g., same account, Bluetooth, ultra-wideband signals, etc.) with matching contexts:

$$Mappingt = \langle ID1, ID2, \ldots, IDn\rangle, \langle P1, P2, \ldots, Pn\rangle \rightarrow \langle \text{Source1}, \text{Source2}, \ldots, Sourcem\rangle, \langle Q1, Q2, \ldots, Qm\times n\rangle \quad \text{(Equation 1)}$$

Mappingt=The mapping for timestamp t,

ID1, ID2, . . . , IDn=n IDs derived from one or a collection of identification techniques or sensors, P1, P2, . . . , Pn=n Probabilities for the given ID, Source1, Source2, . . . , Sourcem=m Sources that are target candidates for the n IDs, and Q1, Q2, . . . , Qm×n=m×n Probabilities for each of the IDs being mapped to each user.

In examples, the IDs may include audio captured via a microphone, video captured via cameras, motion captured via an IMU, schedule information captured via calendar or email, and/or location information captured via GPS, Bluetooth positioning, Wi-Fi positioning ultra-wideband, ultrasound localization, and mobile positioning. The various inputs may be used to extract features and determine a voice, face, or gait fingerprint, or to detect activities, events, or location, thereby determining when a user is using head mounted device 110 with computing device 410. In examples, the database may be local to computing device 410, or stored on a server 170. In examples, the database may be trained via a module executed on computing device 410 or via a module executed on server 170.

In examples, head mounted device in use determination module 486 may determine that the user is viewing computing device display 443 via a computing device camera in communication with computing device 410. For example, a user may be identified on an image or video frame captured with the computing device camera using a combination of image processing, predictive analytics, and/or machine learning. A head mounted device may be further identified as being worn on the user head via further image processing, predictive analytics, and/or machine learning.

Battery determination module 488 may be operable to make a determination that a battery charge level of head mounted device 110 is below a threshold level. In some examples, 488// may receive an indication from 110// representing that the head mounted device batter charge level is low.

Upon receiving an indication, visual representation transfer module 490 may be operable to start or to stop the display of visual representation 220 on computing device display 443 and/or transfer display of visual representation 220 to head mounted device 110. In examples, an indication may include a signal or command instructing computing device 410 to begin or cease displaying visual representation 220. In examples, an indication may include a signal received from head mounted device 110, server 170, or another module executing on processor 423.

In examples, an indication to transfer visual representation to head mounted device may be received from visual representation transfer module 490 determining that a head mounted device battery charge is below a threshold. In examples, an indication to transfer visual representation may be received upon determining that a user is no longer using head mounted device 110 via head mounted device in use determination module 486.

In examples, the indication to transfer display of the visual representation to head mounted device may be sent upon determining that the head mounted device is in use. At least one predictive model may be used to predict whether the head mounted device is in use with the computing device, as described above.

In some examples, video 210 may include a video conference being viewed by a group of users on a single computing device display. The indication may be sent upon determining that at least one user of a group of users watching the video on the computing device display is not displaying the visual representation with a respective head mounted device display. In examples, head mounted device in use determination module 486 may be operable to determine whether each respective user is wearing/using a respective head mounted device via any combination of the methods described above. This may allow, for example, visual representation 220 to seamlessly transfer from each user's respective head mounted device 110 to computing device display 443 when one user stops displaying visual representation 220 with their head mounted device 110. In this way, dropouts of visual representation services to users in the video conference may be avoided.

In examples, any module described with regards to computing device 410 may execute on a web browser extension, add-on, or plugin. In examples, the web browser extension, add-on, or plug-in may be built with HTML, JavaScript, or CSS scripts, or may include an executable code. By executing the modules described herein with regards to computing device 410 in a web browser extension, add-on, or plug-in, it may be possible to enable seamless visual representation display functionality between devices regardless of the service being used to display the video or web conference.

Processor 423 may be configured with instructions for visual representation transfer module 490. Upon receiving an indication, visual representation transfer module 490 may be operable to stop the display of visual representation 220 on computing device display 443 so that it may be transferred to head mounted device 110. In examples, an indication may include a signal or command received form head mounted device 110, one or more servers 170, or another module instructing computing device 410 to stop displaying visual representation 220. In some examples, visual representation transfer module 490 may send an indication to head mounted device 110 to display visual representation 220.

System 400 includes server 170. In examples, server 170 may include one or more servers. Like head mounted device 110 and computing device 410, server 170 also includes a processor 425, a memory 435, and a communications interface 445. In examples, server 170 may further include its own respective visual representation transfer module 495. Its own respective visual representation transfer module 495 may help manage the transfer of the display of visual representation 220 between head mounted device 110 and computing device 410.

Figure 5A:
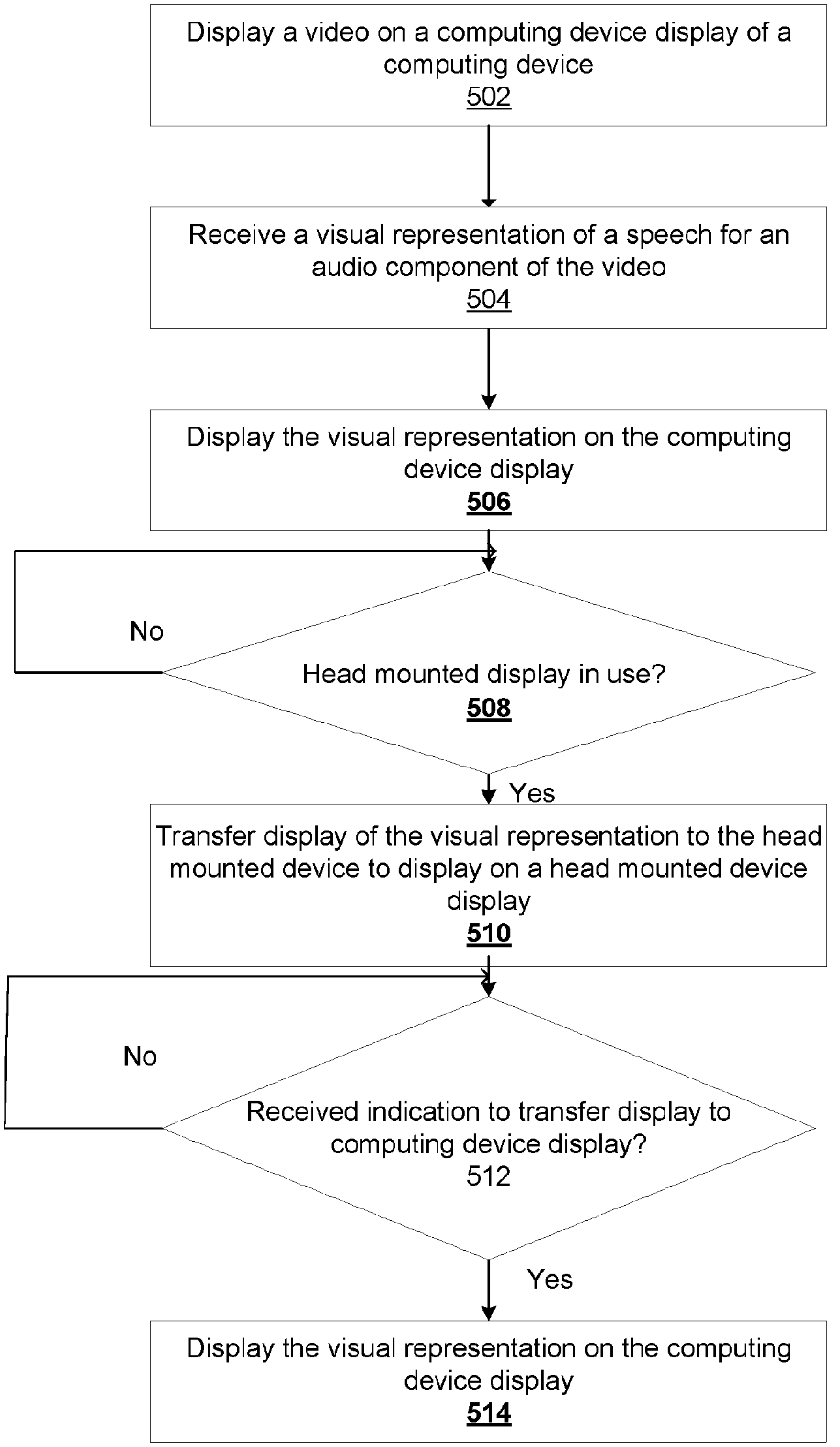
FIG. 5A depicts an example method, which may be executed to transfer the display of visual representation between a head mounted device and a computing device.

FIG. 5A depicts example method 500A, which may be executed to transfer the display of visual representation 220 between head mounted device 110 and computing device 410. In examples, method 500A may be executed on computing device 410. In an example, method 500A may include steps 502, 504, 506, 508, and 510. In further examples, however, method 500A may include any combination of steps 502 to 514.

Method 500A begins with step 502. In step 502, video 210 may be displayed on computing device display 443 of computing device 410. For example, video 210 may be displayed via video display module 484, as described above.

Method 500A continues with step 504. In step 504, a visual representation 220 of speech may be received for an audio component of a video 210. For example, visual representation 220 may be received via visual representation receiving module 480, as described above.

Method 500A continues with step 506. In step 506, visual representation 220 may be displayed on computing device display 443. For example, visual representation 220 may be displayed via visual representation display module 482.

Method 500A continues with step 508. In step 508, it may be determined whether a head mounted display is in use. For example, step 508 may execute head mounted device in use determination module 486, as described above. If it is determined that yes, the head mounted device is in use by a user, then method 500A proceeds with step 510. If it is determined that no, head mounted device is not in use, however, then method 500A remains at step 508.

Method 500A continues with step 510. In step 510, display of the visual representation is transferred to the head mounted device to display on a head mounted device display. For example, visual representation 220 may be transferred to head mounted device 110 via visual representation transfer module 490, as described above.

Method 500A continues with step 512. In step 512, it is determined whether an indication has been received to transfer display to the computing device display. If an indication has been received, then method 500A proceeds with step 514. If an indication has not been received however, then method 500A may remain at step 512.

Method 500A continues with step 514. In step 514, visual representation 220 is displayed on computing device display 320. For example, visual representation 220 may be displayed via visual representation display module 482, as described above.

Figure 5B:
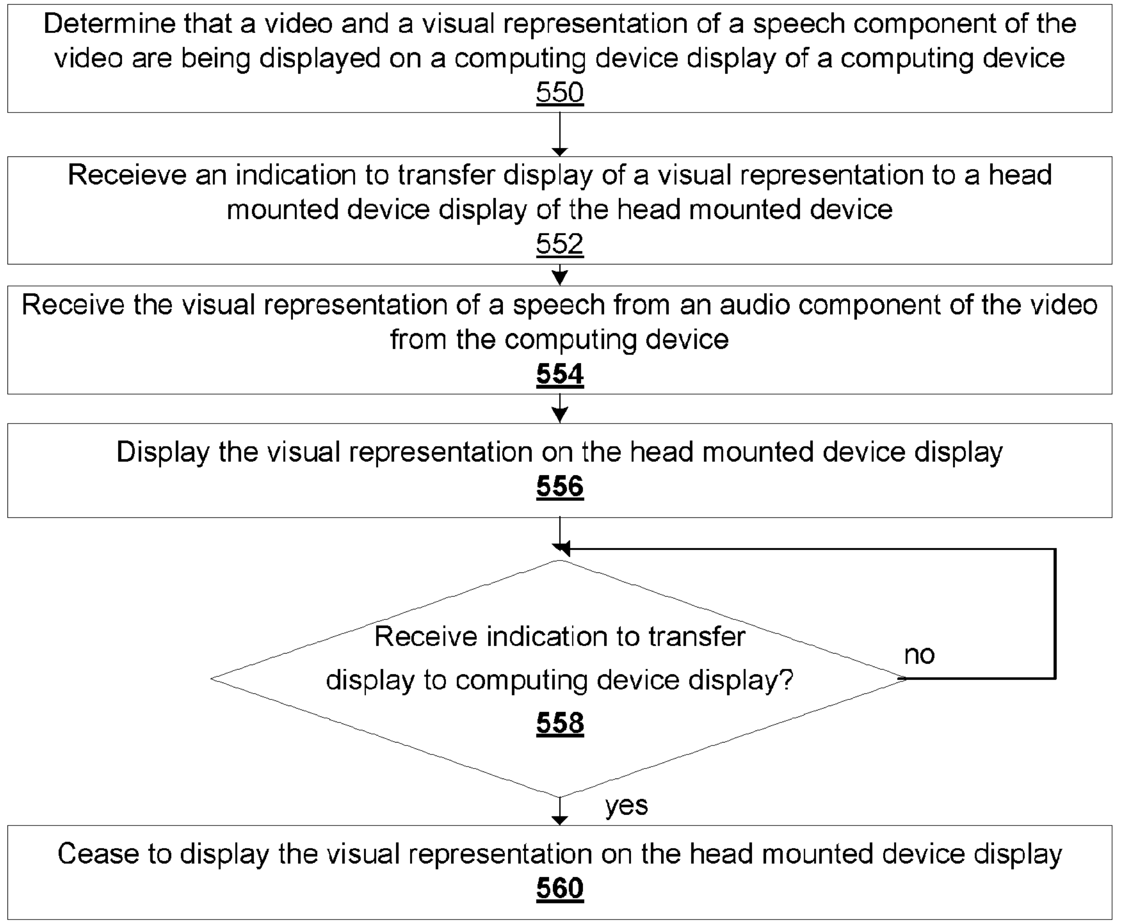
FIG. 5B depicts an example method, which may be executed to transfer a visual representation between a head mounted device and a computing device.

FIG. 5B depicts an example method 500B which may be executed to seamlessly transfer visual representation 220 between handheld device 120 and computing device 410. In examples, method 500B may be executed on an example head mounted device 110.

Method 500B begins with step 550. In step 550 it may be determined that video 210 and visual representation 220 are being displayed on computing device display 443 of computing device 410. For example, head mounted device 110 may execute video and visual representation display determination module 460 as described above.

Method 500B may continue with step 552. In step 552, an indication may be received to transfer display of visual representation 220 to head mounted device display 340. For example, computing device 410 may execute visual representation transfer module 490, as described above.

Method 500B may continue with step 554. In step 554 visual representation 220 of the speech may be received from computing device 410 of an audio component of video 210. For example, head mounted device 110 may execute visual representation receiving module 462, as described above.

Method 500B may continue with step 556. In step 556, visual representation 220 may be displayed on head mounted device display 340. For example, head mounted device 110 may execute visual representation display module 466, as described above.

Method 500B may continue with step 558. In step 558, an indication may be received to transfer display of visual representation 220 to computing device 410. For example, head mounted device 110 may execute visual representation transfer module 468, as described above.

If an indication is received at step 558, method 500B may continue with step 560. In step 560, head mounted device 110 may cease to display visual representation 220. In examples, step 560 may also include sending an indication to transfer the display of visual representation 220 to computing device 410.

Figure 5C:
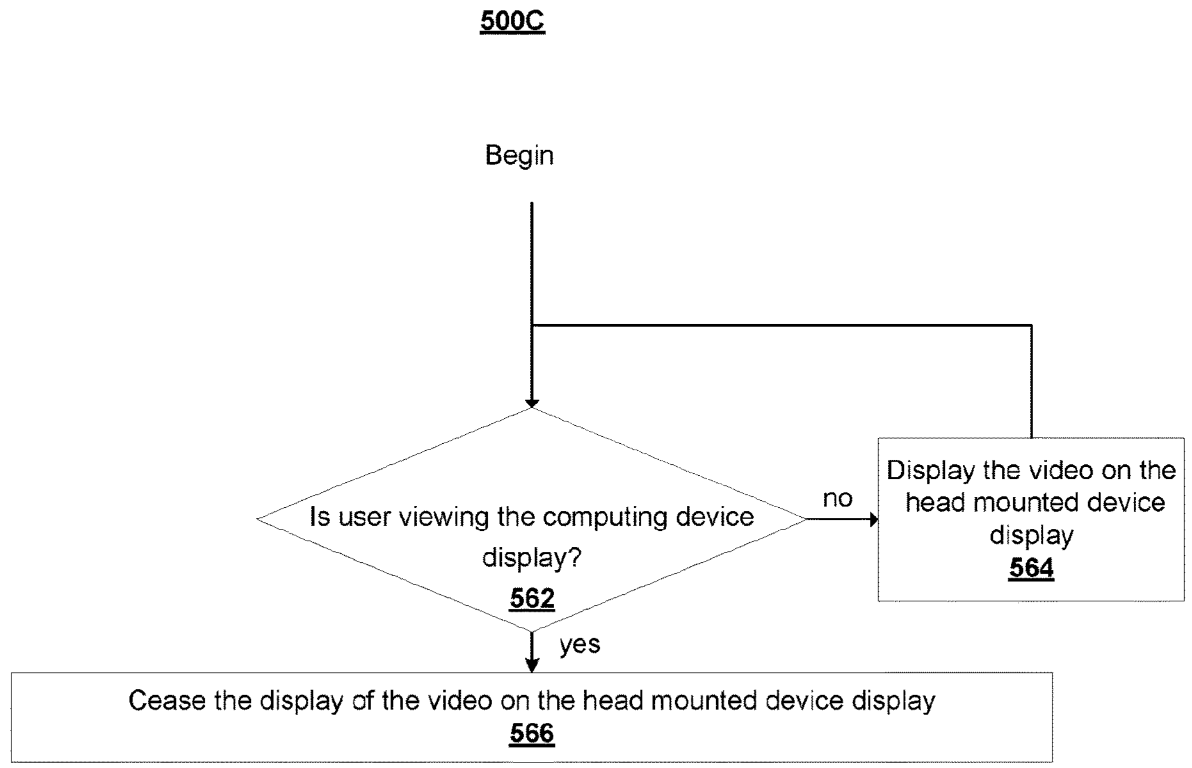
FIG. 5C depicts an example method, which may be executed to transfer the display of a video between a head mounted device and a computing device of FIG. 1.

FIG. 5C depicts method 500C. In examples, method 500B may further include the steps of method 500C. In examples, method 500C may be executed after step 556 of method 500B.

Method 500C may begin with step 562. In step 562, it may be determined whether a user is viewing computing device display 443. In examples, front-facing camera 330 or location sensor 402 may be used to determine whether a user is viewing computing device display 443, as described above. In examples, a camera connected to computing device 410 may be used to determine if the user is viewing computing device display 443.

If the answer to step 562 is no, then method 500B executes step 564. In step 564, video 210 may be displayed on head mounted display 230. For example, head mounted device 110 may execute video display module 470. Displaying video 210 on head mounted device display 340 when computing device display 443 is not in view may allow a user to continue to view video content when the user moves away from computing device display 443. For example, if the user must step away from computing device display 443 to receive a package, the user can continue to follow along.

If step 562 answers true, method 500C continues with step 566. In step 566, head mounted display 110 may cease to display video 210 on head mounted device display 230.

Figure 5D:
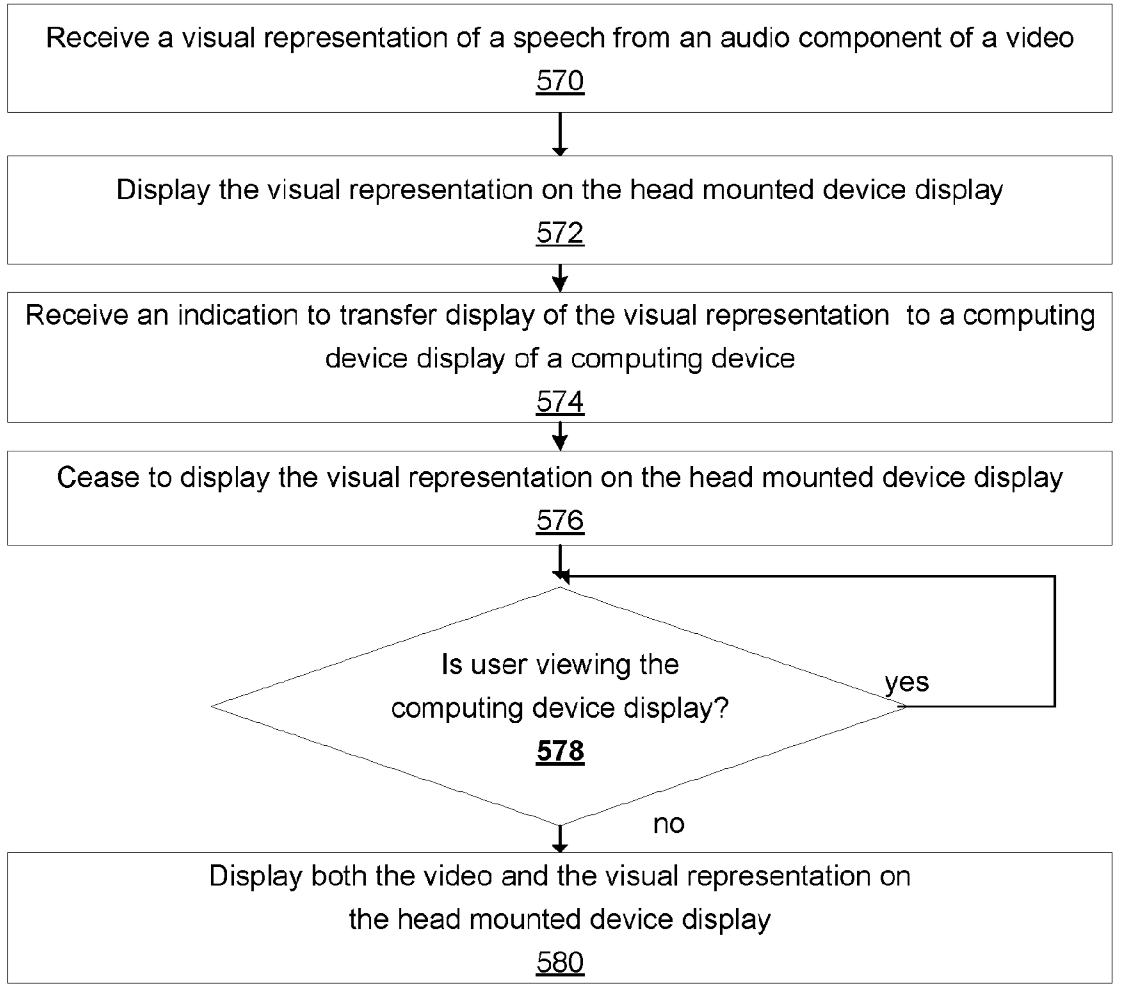
FIG. 5D depicts an example method, which may be executed to transfer the display of a video between a head mounted device and a computing device of FIG. 1.

FIG. 5D depicts method 500D. In examples, method 500D includes steps 570 to 576. In further examples, however, method 500D may include any combination of steps 570-580.

Method 500D may begin with step 570. In step 570, a visual representation of a speech from an audio component of a video may be received. For example, head mounted device 110 may execute visual representation receiving module 462, as described above.

Method 500D may continue with step 572. In step 572, the visual representation may be displayed on the head mounted device display. For example, head mounted device 110 may execute visual representation display module 466, as described above.

Method 500D may continue with step 574. In step 574, an indication may be received to transfer display of the visual representation to a computing device display of a computing device. For example, head mounted device 110 may execute visual representation transfer module 468, as described above.

In examples, the indication to transfer display of the visual representation to a computing device display may be sent upon receiving an indication that the computing device display is displaying the visual representation. In examples, the indication to transfer display of the visual representation to a computing device display may be sent upon determining that the video displaying on the computing device display is in a field of view of a head mounted display camera connected to the head mounted display. In examples, the indication to transfer display of the visual representation to a computing device display may be sent upon determining that a head mounted device battery is below a charge threshold.

Method 500D may continue with step 576. In step 576, the display of the visual representation on the head mounted device display may be stopped. In examples, step 576 may further comprise executing visual representation transfer module 468, as described above.

Method 500D may continue with step 578. In step 578, it may be determined whether a user is viewing the computing device display. For example, an indication may be received that a user is not viewing a computing device display after executing video and visual representation display determination module 460, as described above. If the answer to step 578 is yes, method 500D may execute step 578 again. If the answer to step 578 is no, however, method 500D may continue onto step 580.

In step 580, both the video and the visual representation may be displayed on the head mounted device display. For example, visual representation display module 466 and video display module 470 may be executed by head mounted device 110.

The methods and apparatuses of the description allow for the seamless transfer of a visual representation of speech from a video between user devices, thereby increasing the accessibility of the speech and video content to the user.

Various examples of the systems and techniques described here can be realized in digital electronic circuitry, integrated circuitry, specially designed ASICs (application specific integrated circuits), computer hardware, firmware, software, and/or combinations thereof. These various examples can include example in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various examples of the systems and techniques described here can be realized as and/or generally be referred to herein as a circuit, a module, a block, or a system that can combine software and hardware aspects. For example, a module may include the functions/acts/computer program instructions executing on a processor or some other programmable data processing apparatus.

Some of the above examples are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing examples. Examples, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

The terminology used herein is for the purpose of describing particular embodiments only and is not intended to be limiting of example embodiments. As used herein, the singular forms a, an, and the are intended to include the plural forms as well, unless the context clearly indicates otherwise. It will be further understood that the terms includes, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative examples, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The examples are not limited by these aspects of any given examples.

Lastly, it should also be noted that whilst the accompanying claims set out particular combinations of features described herein, the scope of the present disclosure is not limited to the particular combinations hereafter claimed, but instead extends to encompass any combination of features or examples herein disclosed irrespective of whether or not that particular combination has been specifically enumerated in the accompanying claims at this time.

In some aspects, the techniques described herein relate to a computer-implemented method, wherein determining that the head mounted device is in use further includes: receiving an indication that a user logged onto both the head mounted device and the computing device; receiving an indication that the user is looking at the computing device display through the head mounted device; receiving an indication that a location and orientation of the head mounted device indicate that the user is viewing the computing device display though the head mounted device; or determining that the user is viewing the computing device display via a computing device camera in communication with the computing device.

In some aspects, the techniques described herein relate to a computer-implemented method, further including: upon receiving an indication to transfer display of the visual representation back to the computing device, displaying the visual representation on the computing device display.

In some aspects, the techniques described herein relate to a computer-implemented method, wherein the indication is sent upon determining that a head mounted device battery charge is below a threshold, or that a user is no longer using the head mounted display.

In some aspects, the techniques described herein relate to a computer-implemented method, wherein the indication is sent upon determining that the head mounted device is in further use by predicting, by at least one prediction model, whether the head mounted device is in use with the computing device.

In some aspects, the techniques described herein relate to a computer-implemented method, wherein the video includes a video conference, and the indication is sent upon determining that at least one user of a plurality of users watching the video on the computing device display is not displaying the visual representation with a respective head mounted device display of a respective head mounted device.

In some aspects, the techniques described herein relate to a computer-implemented method, wherein the computer-implemented method executes on a web browser extension, add-on, or plug-in.

In some aspects, the techniques described herein relate to a computer-implemented method, wherein the visual representation includes at least one of a transcription, a translation, a summarization of the speech, a subtitle, an emoji, or a graphic of the speech.

In some aspects, the techniques described herein relate to a computing device, wherein determining that the head mounted device is in use further includes: receiving an indication that a user logged onto both the head mounted device and the computing device, receiving an indication that the user is looking at the computing device display through the head mounted device, receiving an indication that a location and orientation of the head mounted device indicate that the user is viewing the computing device display though the head mounted device, or determining that the user is viewing the computing device display via a computing device camera in communication with the computing device.

In some aspects, the techniques described herein relate to a computing device, wherein the processor is further configured with instructions to: display the visual representation on the computing device display upon receiving an indication to transfer display of the visual representation back to the computing device.

In some aspects, the techniques described herein relate to a computing device, wherein the indication is sent upon determining that a head mounted device battery charge is below a threshold, or that a user is no longer using the head mounted display.

In some aspects, the techniques described herein relate to a computing device, wherein the indication is sent upon determining that a user is no longer using the head mounted display by predicting, by at least one prediction model, whether the head mounted device is in use with the computing device.

In some aspects, the techniques described herein relate to a computing device, wherein the video includes a video conference, and the indication is sent upon determining that at least one user of a plurality of users watching the video on the computing device display is not displaying the visual representation with a respective head mounted device display of a respective head mounted device.

In some aspects, the techniques described herein relate to a computing device, wherein the instructions execute on a web browser extension, add-on, or plug-in.

In some aspects, the techniques described herein relate to a computing device, wherein the visual representation includes at least one of a transcription, a translation, a summarization of the speech, an emoji, or a graphic of the speech.

In some aspects, the techniques described herein relate to a computer-implemented method, further including: upon receiving an indication to transfer display of the visual representation to the computing device, ceasing to display the visual representation on the head mounted device display.

In some aspects, the techniques described herein relate to a computer-implemented method, further including: upon determining that a user is not viewing the computing device display, displaying both the video and the visual representation on the head mounted device display.

In some aspects, the techniques described herein relate to a computer-implemented method, wherein determining that the video is being displayed on the computing device display of the computing device further includes: receiving an indication that the computing device display is displaying the video; or determining that the video displayed on the computing device display is in a field of view 335 of a head mounted display camera connected to the head mounted display.

In some aspects, the techniques described herein relate to a computer-implemented method, further including: upon determining that a head mounted device battery is below a charge threshold, transferring display of the visual representation to the computing device for display on the computing device display.

In some aspects, the techniques described herein relate to a computer-implemented method, wherein the visual representation is at least one of a transcription, a translation, a summarization of the speech, an emoji, or a graphic of the speech.

In some aspects, the techniques described herein relate to a head mounted device, wherein the processor is further configured with instructions to: cease to display the visual representation on the head mounted device display upon receiving an indication to transfer display of the visual representation to the computing device.

In some aspects, the techniques described herein relate to a head mounted device, wherein the processor is further configured with instructions to: display both the video and the visual representation on the head mounted device display upon determining that a user is not viewing the computing device display.

In some aspects, the techniques described herein relate to a head mounted device, wherein determining that the video is being displayed on the computing device display of the computing device further includes receiving an indication that the computing device display is displaying the video; or determining that the video displayed on the computing device display is in a field of view of a head mounted display camera connected to the head mounted display.

In some aspects, the techniques described herein relate to a head mounted device, wherein the processor is further configured with instructions to: transfer display of the visual representation to the computing device for display on the computing device display upon determining that a head mounted device battery is below a charge threshold.

In some aspects, the techniques described herein relate to a head mounted device, wherein the visual representation is at least one of a transcription, a translation, a summarization of the speech, an emoji, or a graphic of the speech.

In some aspects, the techniques described herein relate to a computer-implemented method, further comprising: upon receiving an indication that a user is not viewing the computing device display, displaying both the video and the visual representation on the head mounted device display.

In some aspects, the techniques described herein relate to a computer-implemented method, wherein the indication to transfer display of the visual representation to the computing device display is received upon: receiving an indication that the computing device display is displaying the visual representation; and/or determining that the video displayed on the computing device display is in a field of view of a head mounted display camera connected to the head mounted display; and/or determining that a head mounted device battery is below a charge threshold.

In some aspects, the techniques described herein relate to a computer-implemented method, wherein the visual representation is at least one of a transcription, a translation, a summarization of the speech an emoji, or a graphic of the speech.

In some aspects, the techniques described herein relate to a head mounted device, wherein the processor is further configured with instructions to: display both the video and the visual representation on the head mounted device display upon receiving an indication that a user is not viewing the computing device display.

In some aspects, the techniques described herein relate to a head mounted device, wherein the indication to transfer display of the visual representation to the computing device display is received upon receiving an indication that the computing device display is displaying the visual representation or upon determining that the video displayed on the computing device display is in a field of view of a head mounted display camera connected to the head mounted device.

In some aspects, the techniques described herein relate to a head mounted device, wherein the indication to transfer display of the visual representation to the computing device for display on the computing device display is sent upon determining that a head mounted device battery is below a charge threshold.

In some aspects, the techniques described herein relate to a head mounted device, wherein the visual representation is at least one of a transcription, a translation, a summarization of the speech, an emoji, or a graphic of the speech.

What is claimed is:

1. A computer-implemented method, comprising:

displaying a video, and a visual representation of a speech component of the video, on a first display of a first device;

and upon determining that a wearable device is in use, transferring display of the visual representation to the wearable device to display on a wearable display of the wearable device and ceasing the display of the visual representation on the first display while continuing the display of the video on the first display.

2. The computer-implemented method of claim 1, wherein determining that the wearable device is in use further comprises:

receiving an indication that a user is logged on to both the wearable device and the first device; and/or receiving an indication that the user is looking at the first display through the wearable display; and/or receiving an indication that a location and orientation of the wearable device indicate that the user is viewing the first display through the wearable display; and/or determining that the user is viewing the first display via a camera in communication with the first device.

3. The computer-implemented method of claim 1, further comprising:

upon receiving an indication to transfer display of the visual representation back to the first device, displaying the visual representation on the first display.

4. The computer-implemented method of claim 3, wherein the indication is sent upon determining that a battery charge of the wearable device is below a threshold, or that a user is no longer using the wearable display.

5. The computer-implemented method of claim 3, wherein the video comprises a video conference, and the indication is sent upon determining that at least one user of a plurality of users watching the video on the first display is not displaying the visual representation with a respective wearable display of a respective wearable device.

6. The computer-implemented method of claim 1, wherein the computer-implemented method executes on a web browser extension, add-on, or plug-in.

7. The computer-implemented method of claim 1, wherein the visual representation comprises at least one of a transcription, a translation, a summarization of the speech component, an emoji, or a graphic of the speech component.

8. A display device, comprising:

a first display; and a processor configured with instructions to:

display a video, and a visual representation of a speech component of the video, on the first display; and upon determining that a wearable device is in use, transfer display of the visual representation to the wearable device to display on a wearable display of the wearable device and ceasing the display of the visual representation on the first display while continuing the display of the video on the first display.

9. The display device of claim 8, wherein determining that the wearable device is in use further comprises:

receiving an indication that a user is logged on to both the wearable device and the display device, and/or receiving an indication that the user is looking at the first display through the wearable display, and/or receiving an indication that a location and orientation of the wearable device indicate that the user is viewing the first display through the wearable display, and/or determining that the user is viewing the first display via a camera in communication with the display device.

10. The display device of claim 8, wherein the processor is further configured with instructions to: display the visual representation on the first display upon receiving an indication to transfer display of the visual representation back to the display device.

11. The display device of claim 10, wherein the indication is sent upon determining that a battery charge of the wearable device is below a threshold, or that a user is no longer using the wearable display.

12. The display device of claim 10, wherein the video comprises a video conference, and the indication is sent upon determining that at least one user of a plurality of users watching the video on the first display is not displaying the visual representation with a respective wearable display of a respective wearable device.

13. The display device of claim 8, wherein the instructions execute on a web browser extension, add-on, or plug-in.

14. The display device of claim 8, wherein the visual representation comprises at least one of a transcription, a translation, a summarization of the speech component, an emoji, or a graphic of the speech component.

15. A computer-implemented method, comprising:

determining that a video and a visual representation of a speech component of the video are being displayed on a first display of a first device;

receiving the visual representation of the speech component of the video from the first device; and displaying the visual representation on a wearable display of a wearable device while the display of the visual representation on the first display is ceased and the display of the video on the first display continues.

16. The computer-implemented method of claim 15, further comprising:

upon receiving an indication to transfer display of the visual representation to the first device, ceasing to display the visual representation on the wearable display.

17. The computer-implemented method of claim 15, further comprising:

upon determining that a user is not viewing the first display, displaying both the video and the visual representation on the wearable display.

18. The computer-implemented method of claim 15, wherein determining that the video is being displayed on the first display of the first device further comprises:

receiving an indication that the first display is displaying the video; and/or determining that the video displayed on the first display is in a field of view of a camera connected to the wearable display.

19. The computer-implemented method of claim 15, further comprising:

upon determining that a battery charge of the wearable device is below a threshold, transferring display of the visual representation to the first device for display on the first display.

20. The computer-implemented method of claim 15, wherein the visual representation is at least one of a transcription, a translation, a summarization of the speech component, an emoji, or a graphic of the speech component.

* * * * *